United States Patent [19]

Mori et al.

[11] Patent Number: 4,653,418
[45] Date of Patent: Mar. 31, 1987

[54] RUDDER WITH WINGS AND METHOD FOR MANUFACTURE THEREOF

[75] Inventors: Masahiko Mori; Yoshio Otagaki, both of Yokohama, Japan

[73] Assignee: Ishikawajima-Harima Jukogyo Kabushiki Kaisha, Tokyo, Japan

[21] Appl. No.: 750,984

[22] Filed: Jul. 1, 1985

Related U.S. Application Data

[63] Continuation of Ser. No. 587,015, Mar. 7, 1984, abandoned.

[51] Int. Cl.$^4$ .............................................. B63H 25/38
[52] U.S. Cl. ..................................................... 114/162
[58] Field of Search ...................... 114/144 R, 162–172

[56] References Cited

U.S. PATENT DOCUMENTS

| | | | |
|---|---|---|---|
| 1,639,675 | 8/1927 | Snadecki | 114/162 |
| 1,795,346 | 3/1931 | Rebl | 114/162 |
| 2,099,229 | 11/1937 | Possenheim | 114/162 |
| 3,159,132 | 12/1964 | Petrich | 114/162 |
| 3,230,920 | 1/1966 | Piskorz-Naleck | 114/162 |

FOREIGN PATENT DOCUMENTS

| | | | |
|---|---|---|---|
| 16995 | 1/1983 | Japan | 114/162 |
| 41572 | 6/1925 | Norway | 114/162 |

*Primary Examiner*—Sherman D. Basinger
*Assistant Examiner*—Stephen P. Avila

[57] ABSTRACT

An energy-saving rudder in which auxiliary wings are extended from a conventional rudder so that the rotating energy of the propeller slip stream which impinges on the auxiliary wings can be recovered and converted into the propulsion thrust. Also disclosed is a method for fabricating a rudder with wings. The peripheral portion (trailing edge, leading edge and tip portions) of each auxiliary wing and the root portion thereof are separately fabricated by casting and the upper and lower wing surface plates are welded to the frame which is prepared by assembling the peripheral and root portions of each auxiliary wing. The auxiliary wings therefore can be fabricated and positioned with a high degree of accuracy.

1 Claim, 49 Drawing Figures

RUDDER WITH WINGS AND METHOD FOR MANUFACTURE THEREOF

This application is a continuation of application Ser. No. 587,015 filed Mar. 7, 1984, now abandoned.

BACKGROUND OF THE INVENTION

The present invention relates to a rudder with wings for facilitation of energy saving and a method for manufacture thereof.

In order to increase the steering efficiency of the rudder of a ship, it is advantageous to locate the rudder in the fast propeller slip stream. Therefore the rudders are normally located behind the propeller. In addition to steering the ship, the rudder has a function of propelling the ship. That is, when the rudder encounters the propeller slip stream, the lift is developed so that the propulsion component of the lift serves to propel the ship.

The mechanism of a conventional symmetrical-airfoil shaped rudder for developing the propulsion force will be described.

FIG. 1 shows a view of a propeller 1 from the stern of a ship. In general, the propeller 1 is rotated in the clockwise direction i so that the helical propeller slip stream including rotating streams a-h is formed. FIG. 2 shows a rudder 2 located in the propeller slip stream so that as shown in FIG. 3 oblique streams 3 and 4 impinge against the rudder 2.

In FIG. 3, $V_U$ is a vector indicating the stream flowing upwardly from the axis j of the propeller; $V_L$ is a vector indicating the stream flowing downwardly; $L_U$ is a lift developed by the flow $V_U$; $L_L$ is a lift developed by the flow $V_L$; T is a thrust; $\theta_U$ indicates the direction in which the lift $L_U$ acts; and $\theta_L$ indicates the direction in which the lift $L_L$ acts. When the rudder angle is 0° as shown in FIG. 3, the thrust $T = L_U \cos\theta_U + L_L \cos\theta_L$ is produced. That is, the rudder 2 converts part of the energy of the propeller slip stream into the propulsion force. In other words, the rudder 2 functions as a propulsion device.

However, the energy of the propeller slip stream cannot be satisfactorily recovered when only one rudder blade is located vertically in the propeller slip stream. That is, only the streams d, e and h, a as shown in FIGS. 1 and 2 are utilized.

One of the object of the present invention is therefore to provide a rudder which effectively converts the energy of the propeller slip stream into the propulsion energy.

Another object of the present invention is to provide a method for manufacturing the rudder of the type described in a simple manner yet with a high degree of accuracy.

Preferred embodiments of the present invention will be described in detail with reference to the accompanying drawings.

DETAILED DESCRIPTION OF THE EMBODIMENTS

Figure 4:
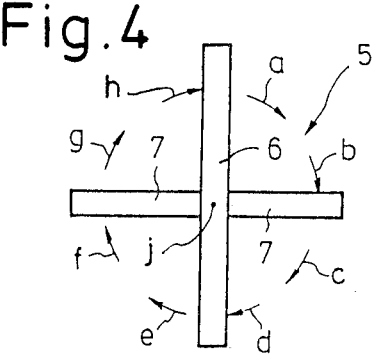
FIG. 4 is a rear view of a first embodiment of the present invention.
Figure 5:
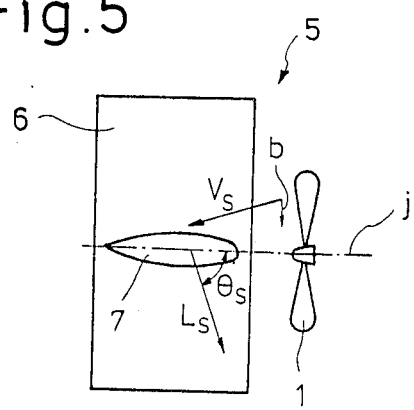
FIG. 5 is a right side view thereof.
Figure 6:
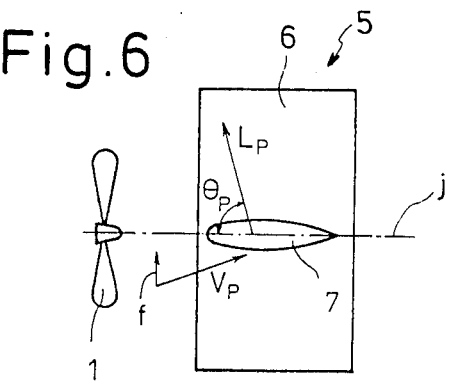
FIG. 6 is a left side view thereof.

FIGS. 4, 5 and 6 show a first embodiment of the present invention in which a rudder 5 comprises a main wing 6 and a horizontal auxiliary wing 7.

The horizontal auxiliary wing 7 develops the lifts $L_S$ and $L_P$ due to the oblique streams $V_S$ and $V_P$ produced by the rotary components b and f of the propeller slip stream. The resultant force T' of the fore-and-aft line components of the lifts $L_S$ and $L_P$ is given by $$T' = L_S \cos \theta_S + L_P \cos \theta_P$$

The resultant force T' provides a new propulsion force and added to the thrust given by $$T = L_U \cos \theta_U + L_L \cos \theta_L$$

Figure 3:
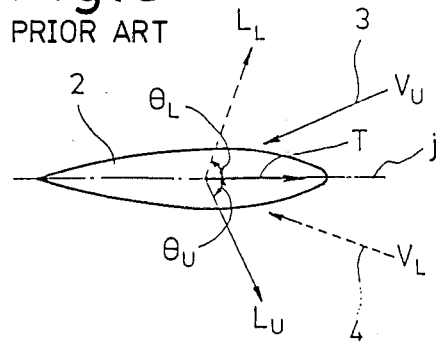

The thrust T is developed by the main wing 6 (See FIG. 3). Therefore the capability of the rudder 5 of recovering the energy of the propeller slip stream can be further increased.

Figure 7:
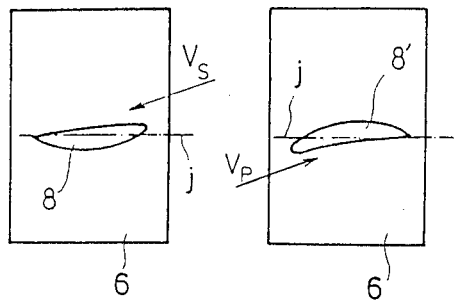
FIG. 7A is a right side view of a second embodiment of the present invention.
FIG. 7B is a left side view thereof.

FIGS. 7A and 7B show a second embodiment of the present invention. The horizontal auxiliary wings 8 and 8' are in the form of an airfoil so as to best utilize the oblique streams $V_S$ and $V_P$. As a result, the lifts $L_S$ and $L_P$ developed by the horizontal auxiliary wings 8 and 8' are increased.

Figure 8:
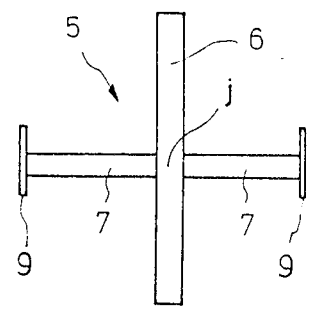
FIG. 8A is a rear view of a third embodiment of the present invention.
FIG. 8B is a right side view thereof.
Figure 8:
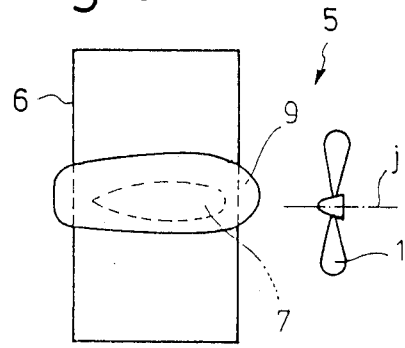

FIGS. 8A and 8B show a third embodiment of the present invention in which a vortex preventive plate 9 is vertically attached to the free end of each of the auxiliary horizontal wings 7 so that wake at downstream of the auxiliary horizontal wings 7 can be ruduced to a minimum. As a result, the energy loss due to such wake can be avoided.

Figure 9:
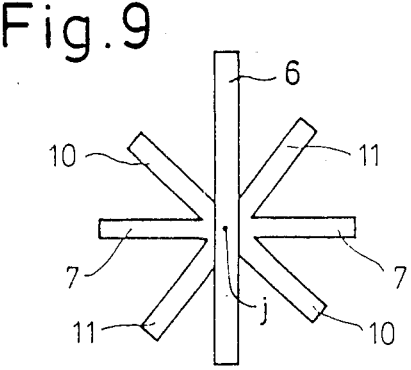
FIG. 9 is a rear view of a fourth embodiment of the present invention.

FIG. 9 shows a fourth embodiment of the present invention in which in addition to the horizontal auxiliary wings 7, oblique auxiliary wings 10 and 11 are added so that the oblique auxiliary wings 10 and 11 can develop the thrusts from the oblique streams produced by the rotary components a, c, e and g.

According to the first through fourth embodiments of the present invention, the horsepower can be reduced by 3–4% as compared with the conventional rudders.

In the first through fourth embodiments, it is assumed that the propeller slip stream is uniformly distributed about the rotational axis j of the propeller so that the each auxiliary wing is fitted at the same height as the axis j.

However, when the propeller slip stream is further studied, it is found out that the influence of the ship's wake on the propeller slip stream cannot be neglected. That is, the influence of the ship's wake on the propeller slip stream must be taken into consideration in the correct analysis of the propeller slip stream. Then, the propulsion of a rudder can be further improved.

As described above, the wings are located in the propeller slip stream so that they can recover the energy of the propeller slip stream and convert it into the propulsion force. It follows therefore that it is preferable to locate them at the place at which the force of the propeller slip stream becomes maximum. The magnitude of the rotary force of the propeller slip stream is dependent on the load rate of the propeller; that is, the thrust produced by per unit area of the propeller disk. Therefore, the higher the load rate of the propeller, the higher or greater the rotary stream becomes. Furthermore the propeller load rate is dependent upon the ship's wake impinging upon the surface of the propeller. Moreover, the slower the speed in the direction of fore-and-aft of the ship's wake the greater the load rate becomes. As a result, the propeller load rate becomes greater at the portion in which the component in the direction of the propeller axis of the ship's wake is small so that the rotary stream becomes greater.

Figure 10:
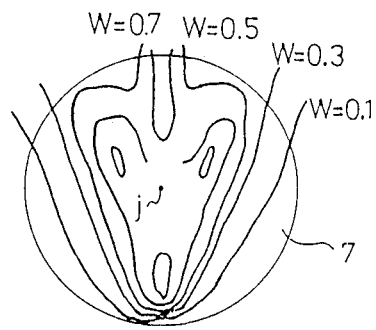
FIG. 10 is a view used to explain the distribution of a ship's wake.

FIG. 10 shows the flow velocity distribution in the direction of the propeller axis of the ship's wake impinging on the surface 12 of the propeller. The wake coefficient W is expressed by $$W = \frac{V_S - V_X}{V_S} \text{ or } V_X = (1 - W)V_S$$

where $V_S$ is the velocity of the ship, and $V_X$ is the velocity in the direction of the propeller axis of the ship's wake.

In general, as shown in FIG. 10, the wake coefficient has a high value in the region above the rotational axis j of the propeller. That is, the velocity $V_X$ in the direction of the propeller axis of the ship's wake is reduced.

Figure 1:
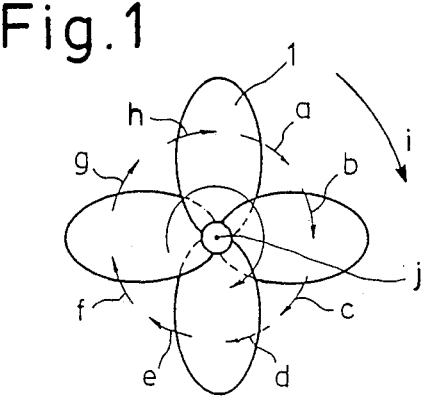
FIG. 1 is a view used to explain the slip stream produced by a propeller.
Figure 2:
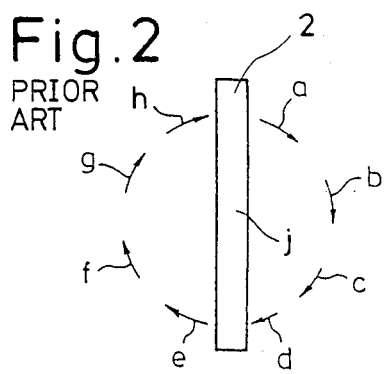
FIGS. 2 and 3 are views used to explain the relationship between the propeller slip stream and a conventional symmetrical-airfoil shaped rudder, FIG. 2 being a rear view of the rudder while FIG. 3 being a top view thereof.
Figure 11:
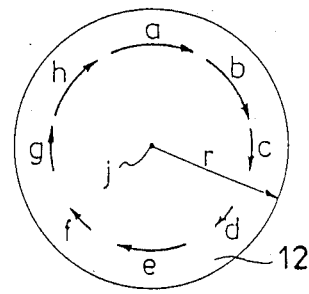
FIG. 11 is a view used to explain the distribution of the rotating streams of the propeller slip stream in the ship's wake.

FIG. 11 shows the distribution of rotary streams a–h of the propeller slip stream after the ship's wake has passed over the propeller surface 12. As in the case of FIG. 1, the length of each arrow indicates the velocity. The radius of the propeller is indicated by r. From FIG. 11, it is seen that the rotary streams a, b, e and h are great in the region in which wake coefficient W is high as indicated in FIG. 10 or in the region in which the velocity $V_X$ in the direction of the propeller axis of the ship's wake is low while the rotary streams c, d, f and g are low in the region where the wake coefficient W is low. Therefore in order to satisfactorily recover the energy of rotation of the propeller slip stream, it is preferable that the wings are located above the axis j of rotation of the propeller.

Figure 12:
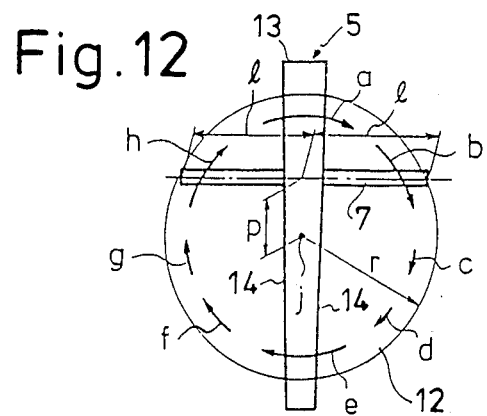
FIG. 12 is a rear view of a fifth embodiment of the present invention.
Figure 13:
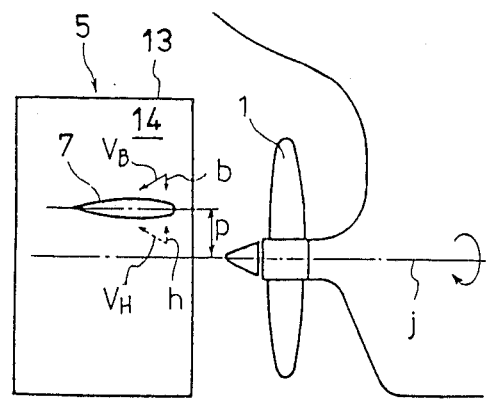
FIG. 13 is a side view thereof.

FIGS. 12 and 13 show a fifth embodiment of the present invention. Reference numeral 1 designates a propeller; and 5, a rudder. Substantially horizontally extended wings 7 are attached to both side surfaces 14 of a rudder blade 13 at an optimum position (to be described below) which is spaced apart by p upwardly from the axis j of the propeller rotation. The propeller slip stream impinges on the wings 7 so that the propulsion force is produced. As compared with a conventional rudder without wing, the propulsion horsepower can be reduced accordingly. Furthermore as compared with the rudder with the wings (7 in FIG. 4) which are attached to the axis j of the propeller rotation, the rotating energy of the high velocity rotary streams b and h above the axis j of the propeller rotation can be recovered so that the propulsion force is developed. In FIG. 13, the oblique streams which correspond to the rotary streams b and h, respectively, are indicated by $V_B$ and $V_H$, respectively.

Figure 14:
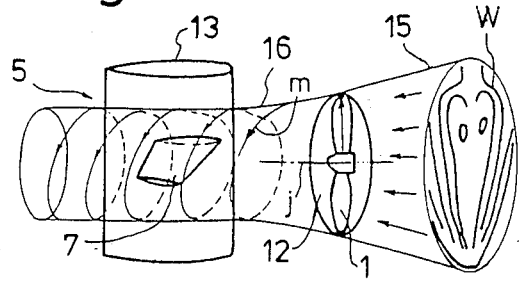
FIG. 14 is a view used to explain the propeller slip stream in the ship's wake.

Next the optimum height at which the wings are disposed will be described. The propeller slip stream will not produce rotary streams over the wide range just behind the propeller and the region in which the rotary streams are developed is limited within a cylinder whose cross section corresponds to the propeller surface 12. FIG. 14 shows that the wake 15 developed by a ship with a propeller which rotates in the clockwise direction passes the propeller surface 12 so that the wake 15 is imparted with the rotating energy and that the propeller slip stream 16 impinges on the rudder in accordance with the present invention. The propeller slip stream 16 is accelerated by the propeller surface 12 so that it flows helically in the direction indicated by the arrow m in a cylinder whose diameter is slightly smaller than the diameter 2r of the propeller.

FIG. 14 shows the regions in which the rotary streams a–h flow. That is, FIG. 14 is a cross-sectional view of the propeller slip stream 16 taken along the rudder 5. The rotary streams are located within the propeller surface 12 with the radius r. As a result, unless the wings 7 which absorb the rotating energy are located within a circle with the radius r, the wings do not operate at all. It follows therefore that the width l of the wing 7 is uniquely given by $$\sqrt{=r^2-p^2}$$

where p is the distance from the axis j of the propeller rotation (FIG. 12).

That is, the width l of the wing 7 becomes greatest (l=r) at the axis j of the propeller rotation and as the position of the wing is displaced upwardly of the axis j of the propeller rotation, the length of the wing is shortened. When the length l of the wing 7 is shortened, the area of the wing is decreased so that the lift produced is also decreased. As a result, the thrust which is the component in the propeller axis of the lift is also decreased. It follows that it is prefereable that in order to increase the area of the wing, the wing 7 is located as closer as possible to the axis j of the propeller rotation.

Because of the reasons described above, it is preferable that the magnitude of the rotary streams due to the propeller slip stream which is under the influence of the ship's wake flowing on the propeller surface is compared with the surface area of the wing so that the height at which the wing is installed is such that the thrust or propulsion force, which is the component in the axis of the propeller of the lift, becomes maximum.

The optimum installation position described above therefore is not uniquely determined because the distribution of the ship's wake varies depending on the design of a hull, but it is considered that the optimum installation position is located above the axis j of the propeller rotation and is spaced apart by 0.2–0.4 times of the radius of the propeller.

Figure 15:
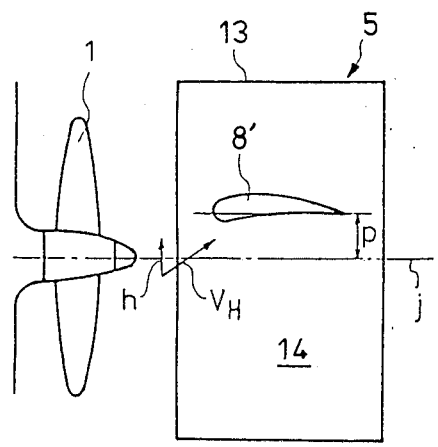
FIG. 15A is a left side view of a sixth embodiment of the present invention.
FIG. 15B is a right side view thereof.
Figure 15:
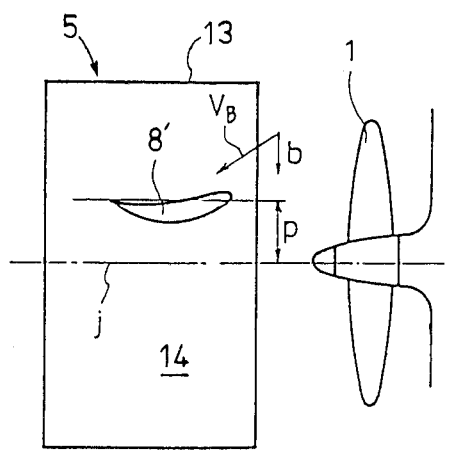

FIGS. 15A and 15B show a sixth embodiment of the present invention. The wings 8 and 8' are in the form of an airfoil so that the oblique streams $V_B$ and $V_H$ are best utilized; that is, the lifts developed by the wings 8 and 8' become greater.

According to the sixth embodiment, the propulsion power can be reduced by 4–5% as compared with the conventional rudders without wing.

Figure 16:
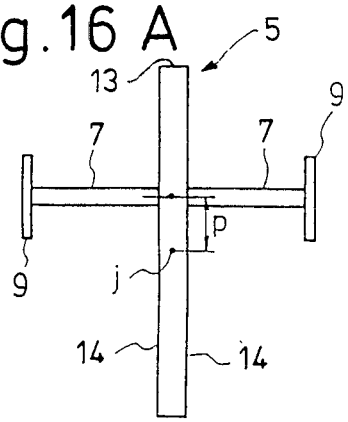
FIG. 16A is a rear view of a seventh embodiment of the present invention.
FIG. 16B is a right side view thereof.
Figure 16:
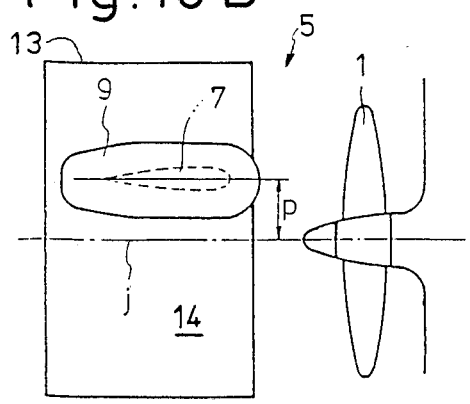

FIGS. 16A and 16B show a seventh embodiment of the present invention. The vortex preventive plate 9 is attached vertically at the free end of the wing 7 so that the wake at downstream of the wing 7 can be reduced to a minimum. As a result, the energy loss due to such wake can be reduced to a minimum.

Figure 17:
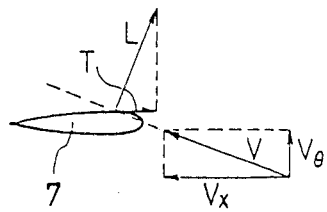
FIGS. 17 and 18 are views used to explain a stream impinging on a wing and a force acting on the wing.
Figure 18:
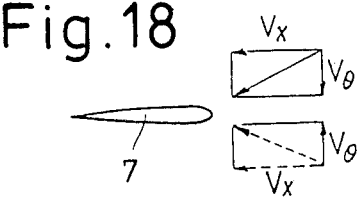

Next the wing installation angle will be described. As described above with reference to FIG. 11, the velocities of the rotary streams vary from one place to another. That is, as shown in FIG. 17, the rotary stream $V_\theta$ varies from one place to another so that the magnitude and direction of the oblique stream V vary. Therefore the wing installation angle must be taken into consideration depending upon the position at which the wing is installed so that the maximum propulsion force can be developed. As shown in FIG. 14, the direction of the rotary stream $V_\theta$ impinging on the wing 7 which is extended toward the right hand is opposite to the direction of the rotary stream impinging on the wing which is extended to the left hand. That is, in the case of the propeller 1 as shown in FIG. 14 which is rotated in the clockwise direction, the rotary flow $V_\theta$ is directed downward on the side of the starboard as indicated by the solid line in FIG. 18 while the rotary stream is directed upward at the port side as indicated by the broken lines. As a result, the attack angles are opposite with respect to the horizontal plane. As a result, there must be provided starboard- and port-side wings which are twisted in the opposite directions.

Figure 19:
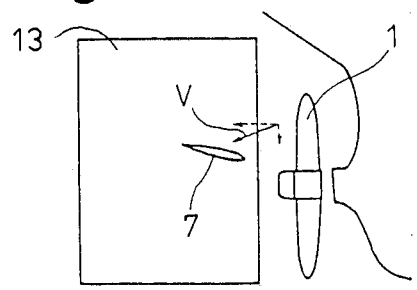
FIG. 19A is a right side view of an eighth embodiment of the present invention.
FIG. 19B is a left side view thereof.
Figure 19:
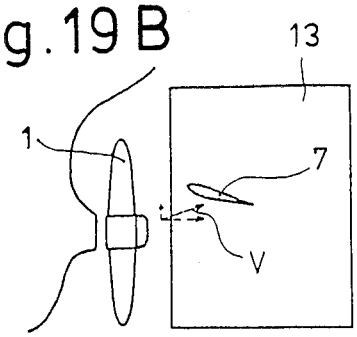
Figure 20:
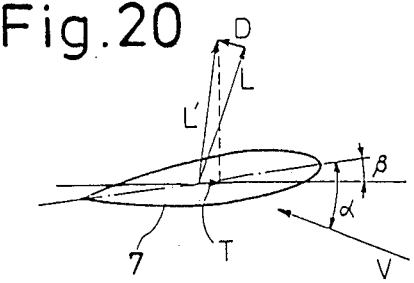
FIG. 20 is a view used to explain a stream impinging on a wing and forces acting on the wing of the rudder as shown in FIGS. 19A and 19B.

FIGS. 19A, 19B and 20 shows an eighth embodiment based upon the above described principle of the present invention.

FIG. 19A is a side view of the starboard-side wing 7 when the propeller 1 rotates in the clockwise direction while FIG. 19B is a side view of the port-side wing 7.

When the wings 7 is located in the oblique stream V as shown in FIG. 20, the following forces act on the wing 7. They are the lift L produced by the oblique stream V, the drag D, the resultant force L' of the lift L and the drag D and the propulsion component T of the force L'.

When the angle $\alpha$ of installation of the wing 7 with respect to the horizontal plane is varied, the attack angle $\alpha$ of the wing 7 with respect to the oblique stream V varies so that the propulsion component T of the resultant force L' also varies. The drag D causes the attack angle $\alpha$ to increase and there does exist the attack angle $\alpha$ at which the propulsion component T becomes maximum. Therefore, if the propeller load and the ship's wake 15 (See FIG. 14) are predetermined, the magnitude and direction of the oblique stream V can be assumed so that the optimum wing installation angle $\beta$ can be determined. It should be noted that the wing installation angle at the starboard may be different from the wing installation angle at the port.

Figure 21A:
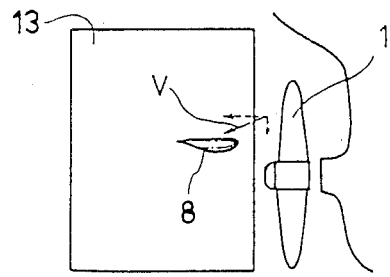
FIG. 21A is a right side view of a ninth embodiment of the present invention.
Figure 21B:
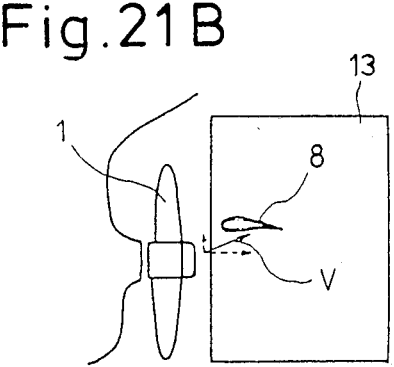
FIG. 21B is a left side view thereof.
Figure 22:
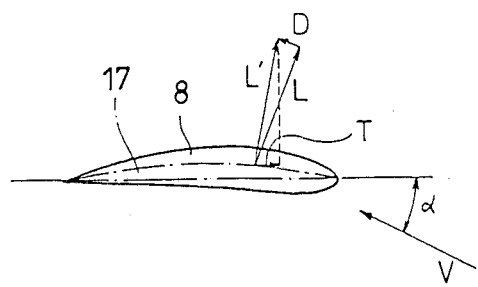
FIG. 22 is a view used to explain a stream impinging on the wing and forces acting on the wing as shown in FIGS. 21A and 21B.

FIGS. 21A, 21B and 22 show a ninth embodiment of the present invention. FIG. 21A shows a starboard-side wing when the propeller 1 is rotated in the clockwise direction while FIG. 22B shows a port-side wing. Wings which are twisted in the opposite directions are attached to both side surfaces of a rudder blade 13. A second method for increasing the propulsion force or thrust of a wing located in an oblique stream is to attach asymmetric wings with a camber (See FIG. 22). The forces which act on the symmetric wing as shown in FIG. 20 also act on the asymmetric wing 8 with the camber 17 as shown in FIG. 22, but it should be noted that when they have the same attack angle α, the lift L is increased. As a result, a greater propulsion component T can be obtained if the wing 8 is given with a camber 17. In this case, depending upon the directions of the oblique streams V, the asymmetric wings 8 with opposite cambers 17 are attached to the starboard- and port-side surfaces of the rudder blade 13.

According to the ninth embodiment of the present invention described above, the propulsion force or thrust can be increased as compared with the case in which the symmetric wings are attached horizontally considering the propeller slip stream and the twist of the wings, further energy saving can be attained.

Figure 23:
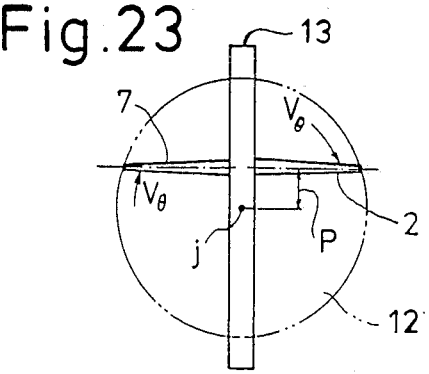
FIG. 23 shows a rudder with horizontal wings.

Next a tenth embodiment in which wings are inclined at an angle with respect to the horizontal will be described. As shown in FIG. 23, the rotary streams $V_\theta$ of the propeller slip stream impinge at an angle on the wings 7. The vertical component of $V_\theta$ is an effective component developing the lift of the wing 7, but the horizontal component (that is, the component directed from the root of the wing to the tip of the wing) does not contribute to the development of the lift.

Figure 24:
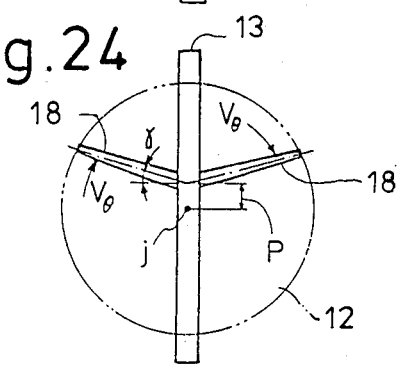
FIG. 24 shows a rudder with inclined or oblique wings which is a tenth embodiment of the present invention.

Therefore, in order to effectively recover the energy of the rotary stream $V_\theta$, the wing 7 is so located that the rotary stream $V_\theta$ impinges on the wing 7 at right angles. Then no horizontal component which is ineffective will be produced. That is, in order to utilize all the component of the rotary stream $V_\theta$ so as to develop the lift of the wing 7, the wing 18 is inclined upwardly at an angle γ as shown in FIG. 24. The angle γ of inclination is dependent upon the vertical distance p between the axis j of the propeller rotation and the root of the wing 18. The optimum distance p has been alreadly described in detail with reference to the fifth embodiment. In FIGS. 23 and 24, the reference numeral 12 designates a propeller circle.

Figure 25:
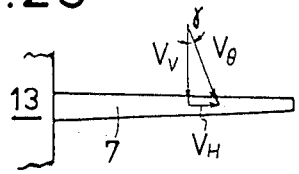
FIG. 25 is an enlarged view of FIG. 23.
Figure 26:
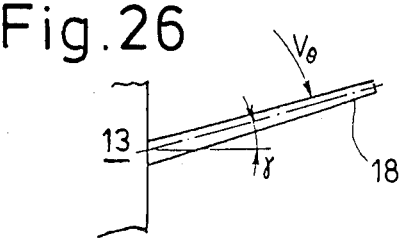
FIG. 26 is an enlarged view of FIG. 24.

FIG. 25 shows, on enlarged scale, the wing 7 which is shown in FIG. 23 while FIG. 26 shows, on enlarged scale, the wing 18 which is shown in FIG. 24. In FIG. 25, the rotary stream $V_\theta$ which impinges at an angle on the wing 7 is resolved into the vertical component $V_V$ and the horizontal component $V_H$. That is, $V_V = V_\theta \cos \gamma$ $V_H = V_\theta \sin \gamma$ where the angle γ is an angle between the rotary stream $V_\theta$ and the vertical line normal to the wing 7.

Figure 27:
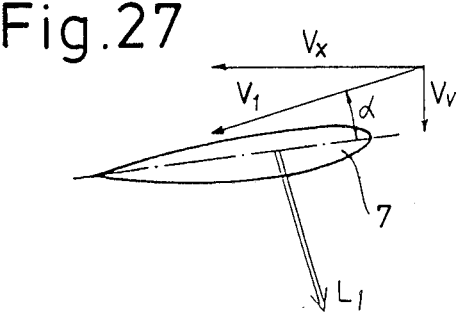
FIG. 27 is a sectional view, on enlarged scale, of the wing as shown in FIGS. 23 and 25.
Figure 28:
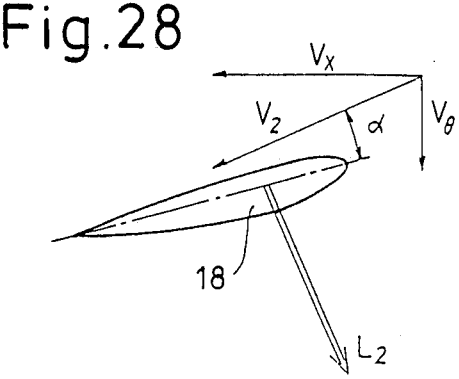
FIG. 28 is a sectional view, on enlarged scale, of the wing as shown in FIGS. 24 and 26.

FIG. 27 shows a typical cross-sectional view of the wing which is shown in FIG. 23 while FIG. 28 shows a typical cross-sectional view of the wing which is shown in FIG. 24. That is, FIG. 27 is a sectional view of the wing which is extended horizontally while FIG. 28 is a sectional view of the wing 18 which is inclined upwardly at an angle.

In FIGS. 27 and 28, $V_X$ is the component in the axial direction of the propeller slip stream and the vertical component $V_V$ as shown in FIG. 27 corresponds to the vertical component $V_V$ as shown in FIG. 25. The rotary stream $V_\theta$ as shown in FIG. 28 corresponds to the rotary stream $V_\theta$ as shown in FIG. 26. Therefore, in FIG. 27, the resultant $V_1$ of the components $V_X$ and $V_V$ impinges on the wing 7. In FIG. 22, the resultant $V_2$ and $V_X$ and $V_\theta$ impinges on the wing 18. Therefore $$V_1 = \sqrt{V_X^2 + V_V^2}$$

$$= \sqrt{V_X^2 + V_\theta^2 \cos^2 \tau}$$

$$V_2 = \sqrt{V_X^2 + V_\theta^2}$$

In order to reduce the drag to a minimum, each wing is installed at an optimum attack angle α with respect to the oblique stream $V_1$ or $V_2$. In this case, the lift of the wing 7 or 18 is in proportion to the square of the velocity of the oblique stream. Since $V_2 > V_1$ as described above, the lift $L_2$ in FIG. 28 is greater than the lift $L_1$ in FIG. 27. The oblique stream $V_2$ has a greater angle of flow than the oblique stream $V_1$. According to the theory of the wing, the lift is at right angles with respect to the oblique stream $V_1$ or $V_2$ impinging on the wing 7 or 18 so that the lift $L_2$ is inclined greater than the lift $L_1$ with respect to the vertical.

$L_2 > L_1$ and the angle of the lift $L_2$ is greater than the angle of the lift $L_1$ so that the fore-and-aft component of the lift, i.e., the propulsion thrust shown in FIG. 28 is greater than that shown in FIG. 27. As a result, when the wing is installed upwardly of the axis j of the propeller shaft, the propulsion thrust becomes greater when the wing 18 is inclined upwardly at angle γ. Next the upward and downward movements of the wing attached to the rudder or the rudder supporting device in the case of the motion of a ship in the waves will be discussed. When the motion of the ship becomes greater, the wing jumps into the air from the water and then is immersed again into the water. Such motion of the wing is repeated as the ship is moved. Therefore, when the wing strikes against the water, an impact is imparted to the wing. If the impact is reduced to some extent, the stress of the wing can be decreased so that the wing which is light in weight can be designed.

In general, it has been well known that a wedge with an obtuse angle can relax the impact more than a wedge with an acute angle. For instance, in order to express the impact of a wedge, the following famous formula of Von-Karman is used:

$$P = \frac{\pi}{\tan \beta'} \cdot \frac{1}{2} \rho V^2$$

where
P: the impact,
β′: the angle between the inclined surface of the wedge and the horizontal plane,
V: the velocity at which the wedge strikes against the water, and
ρ: the density of water,
It is seen that the greater the angle β′ (that is, a wedge with an acute angle), the less the impact becomes. The same is true for the wings in accordance with the present invention That is, the impact exerted to the inclined wings as shown in FIG. 24 is smaller than the impact exerted to the horizontal wings as shown in FIG. 23.

Figure 29:
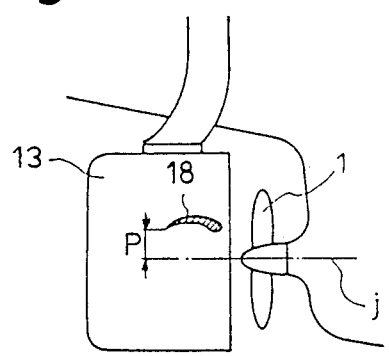
FIG. 29 is a right side view of an eleventh embodiment of the present invention.

FIG. 29 shows an eleventh embodiment of the present invention. Reference numeral 1 designates a propeller; and 18, a wing directly joined to the side surface of a rudder blade 13. The root of the wing 18 is spaced apart upwardly from the axis j of the propeller shaft by p.

Figure 30:
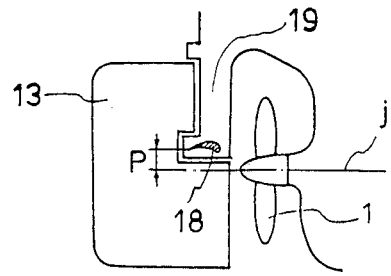
FIG. 30 is a right side view of a twelfth embodiment of the present invention.

FIG. 30 shows a twelfth embodiment of the present invention which is similar to the eleventh embodiment except that the wing 18 is securely attached to a rudder supporting member 19. The root of the wing 18 is spaced apart upwardly from the axis j of the propeller shaft by p, so that the same effects as the eleventh embodiment shown in FIG. 29 can be obtained. Furthermore, the strength can be advantageously increased because the wing is securely attached to the rudder supporting member 19 which in turn is directly joined to the hull.

Figure 31:
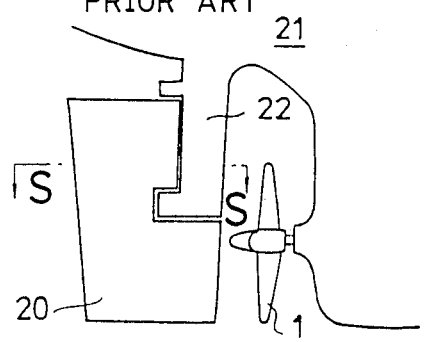
FIG. 31 is a right side view of a conventional hanging rudder.
Figure 32:
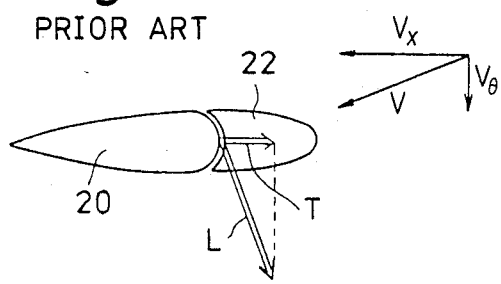
FIG. 32 is a sectional view, on enlarged scale, taken along the line S—S of FIG. 31.

FIGS. 31 and 32 show a hanging rudder in which a wing is attached to a rudder supporting member 22 (to be referred to as "a rudder horn" in this specification) which supports a rudder blade.

FIG. 31 shows a conventional hanging rudder. Located at downstream of a propeller 1 or in the propeller slip stream is a rudder blade 20 which is in the form of an airfoil extended in the fore-and-aft direction and which is enlarged in the direction of the depth of the ship's hull. The rudder blade 20 is rotatably supported by the rudder horn 22 which in turn is depending from the stern 21 of the ship. As best shown in FIG. 32, the rudder blade 20 which is turned and the rudder horn 22 which support the rudder blade 20 are in the form of an airfoil. As described above, the oblique streams V (the velocity in the axial direction is $V_x$ and the peripheral velocity is $V_\theta$) produced by the propeller slip stream impinge on them so that the lift L is produced. The fore-and-aft component of the lift L becomes the propulsion thrust T.

Figure 33:
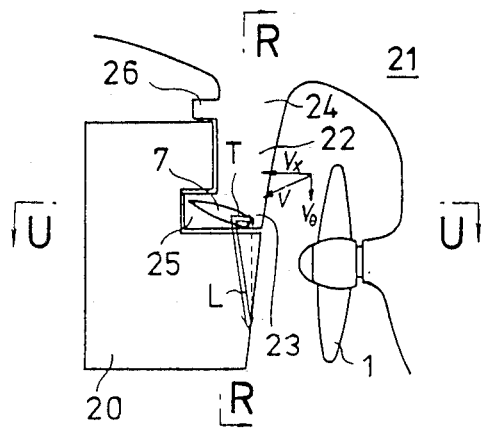
FIG. 33 is a detail side view of FIG. 30 in accordance with the present invention.
Figure 34:
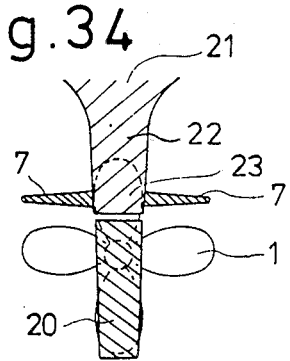
FIG. 34 is a sectional view taken along the line R—R of FIG. 33.

FIGS. 33 and 34 show the present invention more in detail than FIG. 30. Reference numeral 1 designates a propeller; 20, a rudder blade; 21, a stern; and 22, a rudder horn which is securely attached to the stern 21. As shown in FIG. 33, the depending portion 23 and the root portion 24 of the rudder horn 22 are extended out of the hull. Gudgeons 25 and 26 are formed integral with the depending portion 23 and the root portion 24. The vertical shaft extended from the rudder blade 20 are rotatably fitted into these gudgeons 25 and 26.

Wings 7 are attached to both the side surfaces of the rudder horn 22. That is, the wing 7 is located at upstream of the rudder blade 20. More particularly, the wing 7 is formed integral with the gudgeon 25, so that the wing 7 is located at the position (the upper portion in the figure) where the rotary velocity component is higher (that is, the rotary energy is high) above the axis j of the propeller shaft. The wing 7 is in the form of an airfoil as is the case of the rudder blade 20.

When the ship moves straightly, the oblique stream V or the resultant of the axial flow $V_x$ and the peripheral flow $V_\theta$ impinges on the wing 7 as shown in FIGS. 33 and 34 so that the lift L is developed. The fore-and-aft component of the lift L becomes the propulsion thrust T. Since the stream in a region of the propeller slip stream where the rotating energy is high, the propulsion thrust T can be developed in an efficient manner.

Figure 35:
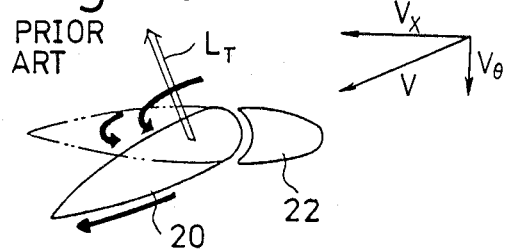
FIG. 35 is a view used to explain the lift developed when the rudder as shown in FIG. 32 is steered.

However, when the rudder blade 20 is steered, the rudder blade 20 and the rudder horn 22 cannot maintain airfoil shape as best shown in FIG. 35. As a result, the direction of the propeller slip stream is changed as indicated by the arrows around the rudder blade 20. Thus, the lift $L_T$ for turning the ship is produced, but no propulsion thrust can be obtained.

Figure 36:
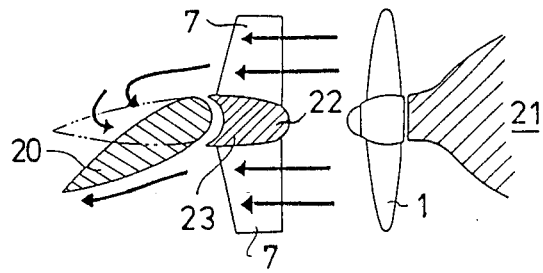
FIG. 36 is a sectional view taken along the line U—U of FIG. 33.

FIG. 36 indicates that the present invention can substantially overcome the above described problems and which can increase the propulsion thrust.

The wing 7 is attached to the rudder horn 22 which is located at upstream of the rudder blade 20 so that when the rudder blade 20 is rotated about the gudgeons 25 and 26 as shown in FIG. 36, the position of the wing 7 relative to the propeller 1 remains unchanged. As a result, the lift T is still developed. Thus the stable performance can be ensured.

Moreover, the wing 7 is attached to the depending portion 25 of the rudder horn 22, which is directly extended out of the hull, so that the strength of the wing 7 can be increased. The performance is satisfactory and its strength is highly reliable.

So far the rudder which is adapted to develop a high propulsion thrust by effectively utilizing the rotating energy of the propeller slip stream and more particularly the position at which the auxiliary wing is installed have been described. In order to obtain satisfactory effects, it is important to install an auxiliary wing which is hydrodynamically efficient or which has a high lift-to-drag ratio. Such wing becomes thin and precise airfoil in which the chord line is relatively longer while the thickness is relatively thin. Therefore, the wing must be fabricated with a high degree of precision and there must be devised a method by which the wing can be securely attached. The method of fabricating the wing will be discussed below on the assumption that the auxiliary wing 7 is attached to the rudder horn 22 (See FIG. 37).

Figure 38:
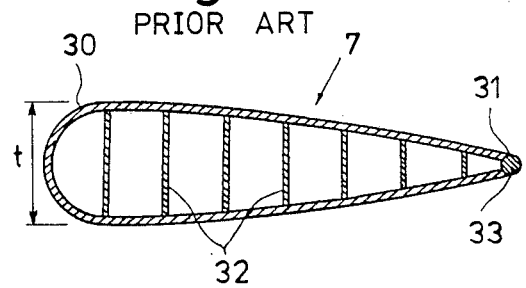
FIG. 38 is a sectional view showing the construction of a conventional wing.

So far, as shown in FIG. 38, a flat steel plate 30 is formed into a wing 7 by the rolling process or the hot working process in such a way that the trailing edge 31 of the wing 7 is opened. Wing ribs 32 are disposed within the wing 7 and welded thereto. Thereafter a round rod 30 is welded to close the opened trailing edge 31 of the wing 7.

Figure 37:
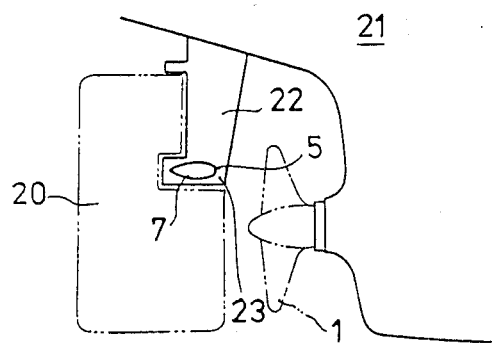
FIG. 37 is a schematic right side view of a hanging rudder.

Such method as described above can be readily applied in the fabrication of the rudder blade 20 which has a great thickness t because the steel plate 30 can be easily formed, but it cannot be applied to a small thin-airfoil-shaped wing 7 which is attached to a rudder horn 22 as shown in FIG. 37. That is, it is difficult to maintain a desired degree of accuracy in shape. When the fabricated wing 7 is attached to the depending portion 23 of the rudder horn 22, it is difficult to to locate the wing 7 with respect to the rudder horn 22 with a desired degree of accuracy. As a result, the attached wing cannot accomplish satisfactory performance.

The present invention was made to overcome the above and other problems encountered in the prior art wing fabrication methods and has for its object to provide a method for fabricating a rudder with wings which can fabricate the wings with a high degree of accuracy in shape and can dispose the fabricated wing at a desired position with a high degree of accuracy and which can ensure the strength of the fabricated wings so that the satisfactory performance of the wings can be ensured.

One preferred embodiment or example of the method for fabricating a rudder with wings in accordance with the present invention will be described below.

Figure 39:
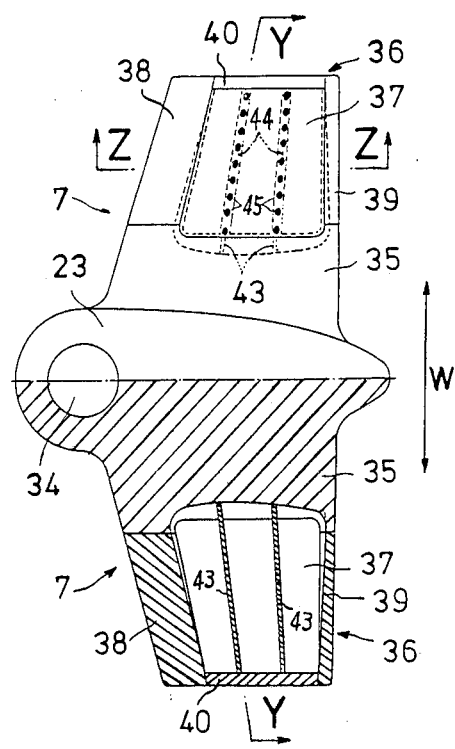
FIG. 39 is a top view, partly in section, of a rudder wing fabricated in accordance with the present invention.
Figure 40:
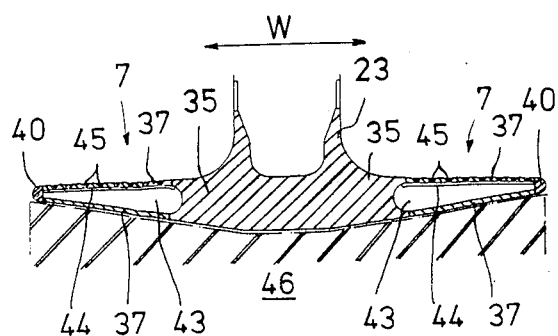
FIG. 40 is a sectional view, on reduced scale, taken along the line Y—Y of FIG. 39.

In FIGS. 39 and 40, the depending portion 23 of the rudder horn 22 has a through hole 34 through which is extended the shaft (not shown) so that the rudder blade 20, which depends from the stern 21, can be rotatably supported. The wings 7 are horizontally extended from the depending portion 23 in the widthwise direction W of the ship.

The wing 7 comprises a root portion 35 which has predetermined thickness and width and which is extended in the widthwise direction W of the ship, a peripheral portion 36 whose one side is the root portion 35 and which is extended in the widthwise direction W of the ship so as to define a circular frame, and a wing surface plate 37 which sandwiches the frame consisting of the root portion 35 and the peripheral portion 36, thereby forming the surfaces of the wing 7.

Figure 41:
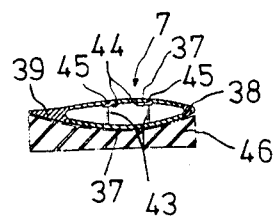
FIG. 41 is a sectional view, on reduced scale, taken along the line Z—Z of FIG. 39.

The peripheral portion 36 comprises a leading edge portion 38 on the side of the propeller, a trailing edge portion 39 on the side of the rudder blade and a tip portion 40 which is in opposed relationship with the root portion and interconnects the leading and trailing edge portions 38 and 39. As shown in FIGS. 39, 40 and 41, beams 43 which are spaced apart from each other by a suitable distance are extended between the root portion 35 and the tip portion 40 of the wing 7 so that the wing structure may be reinforced. As backing plate 44 is interposed between the beams 43 and the wing surface plate 37 (especially the upper surface plate) so that welding may be facilitated. According to this embodiment, the wing surface plate 37 is formed with slot welding holes 45 along the backing plate 44.

In FIGS. 40 and 41, reference numeral 46 designates a working stand upon which the wing 7 is assembled.

Next the fabricating and assembling steps of the wing 7 of the type described will be explained. As shown in FIGS. 39, 40 and 41, first the depending portion 23 of the rudder horn 22 and the root portion 35 of the wing 7 are formed integral by casting.

At the same time, the peripheral portion 36 comprising the leading edge portion 38, the trailing edge portion 39 and the tip portion 40 is cast separately.

The wing surface plate 37 is fabricated into a predetemined shape by rolling a steel plate. Beams 43 and backing plates 44 are cut off from steel plates.

The lower wing surface plate 37 is placed upon the working stand 46 welded together with the depending portion 23 and the peripheral portion 36. The root portion 35 and the peripheral portion 36 are welded together, whereby the frame is fabricated. The beams 43 are extended between the root portion 35 and the tip portion 38 and welded to the wing surface plates 37.

Thereafter the backing plates 44 are welded to the beams 43 and the upper wing surface plate 37 is placed over the backing plate 44 and slot welded thereto.

The wing 7 is fabricated by the above described sequence. According to the present invention, the depending portion 23 of the rudder horn 22 and the roop portion 35 of the wing 7 are cast as a unitary construction and the peripheral portion 36 of the wing 7 is fabricated by casting. As a result, the installation and shape accuracies can be remarkably improved so that the satisfactory performance of the wing 7 can be ensured. In addition, the strength of the wing can be increased.

The fabrication of the wing 7 becomes very simple because the frames are fabricated by casting so that the number of fabrication steps can be reduced.

In additon, the number of molded parts is reduced to a minimum so that the accuracy in shape can be maintained so that the weight of the wing can be considerably reduced as compared with the case in which the whole wing is fabricated by casting.

In this embodiment the upper wing surface plate 37 has been described as being slot welded to the backing plates 44, but it is to be understood that the upper wing surface plate 37 is divided into a plurality of sections along the backing plates 44 and the divided sections are continuously welded to the backing plates 44.

The lower wing surface plate 37 has been described as being welded to the beams 43 when the lower wing surface plate 37 is welded to the root portion 35 and the peripheral portion 36, but it is to be understood that the beams 43 may be previously welded to the wing surface plate 37.

Figure 42:
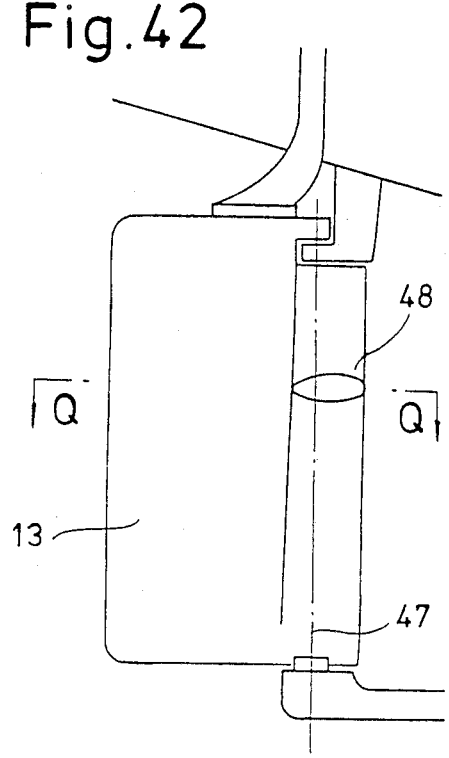
FIG. 42 is a side view of a fourteenth embodiment in accordance with the present invention.
Figure 43:
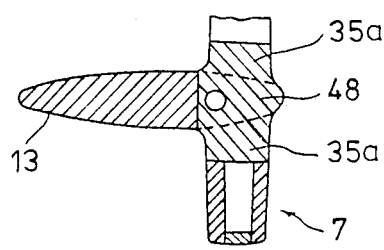
FIG. 43 is a sectional view taken along the line Q—Q of FIG. 42.

FIGS. 42 and 43 show another embodiment in which the root portion 35a of the wing 7 can be cast integral with a leading edge portion 48 which has a pivot shaft 47 for supporting the rudder blade 13. Other constructions are substantially similar to those described above and the same effects as described above can be obtained.

It is to be understood that the method of the present invention is not limited to the above described embodiment and that various modifications can be effected without leaving the scope of the present invention.

The method in accordance with the present invention for fabricating the rudder with wings has the following effects, features and advantages:

(i) Since the supporting shaft of the rudder blade and the root portion of the wing are formed integral by casting, the installation accuracy can be remarkably improved.

(ii) Since the peripheral portion of the wing is also fabricated by casting, the accuracy in shape can be remarkably improved.

(iii) As a result, the performance of the wing can be ensured. Furthermore, the strength of the wing can be improved.

(iv) The frame of the wing is fabricated by the precision casting so that the fabrication can be simplified and the number of fabrication steps can be reduced.

It is to be understood that the rudder with wings and the method for fabrication thereof according to the present invention are not limited to the above described embodiments and that the present invention may be equally applied to the rudders which are located behind twin or multiple screws. It it also to be understood that various modifications can be effected without leaving the true spirit of the present invention.

The effects, features and advantages of the present invention may be summarized as follows:

(1) The wing is disposed at right angles to the vertical main shaft so that the rotating energy of the propeller slip stream can be converted into the propulsion thrust in a very effective manner. As a result, the output of the main engine can be reduced or the fuel consumption can be decreased. That is, the energy savings can be attained.

(2) The auxiliary wings can be attached in a simple manner to the existing rudders so that the present invention can be widely used.

(3) The edges of the auxiliary wings and the joints between the main and auxiliary wings are fabricated by casting so that thin auxiliary wings can be fabricated with high degree of accuracy and can be securely attached to the main wings. As a result, the satisfactory performance of the auxiliary wings can be ensured.

What is claimed is:

1. In combination at a ship: a propeller of a certain radius and having an essentially horizontal axis of rotation, and a rudder having a substantially vertically extending rudder plate located behind the propeller, and also having only two wings, one on each side of said rudder plate and having a longitudinal axis extending substantially horizontally above said axis of rotation by 0.2 to 0.4 times the radius of the propeller.

* * * * *